(12) United States Patent
Hayashi et al.

(10) Patent No.: US 7,134,693 B2
(45) Date of Patent: Nov. 14, 2006

(54) SUPPORT APPARATUS FOR STEERING COLUMN

(75) Inventors: Syogo Hayashi, Aichi (JP); Haruhide Kurita, Coldwater, MI (US)

(73) Assignee: Fuji Kiko Co., Ltd., Kosai (JP)

( * ) Notice: Subject to any disclaimer, the term of this patent is extended or adjusted under 35 U.S.C. 154(b) by 301 days.

(21) Appl. No.: 10/733,772

(22) Filed: Dec. 12, 2003

(65) Prior Publication Data

US 2004/0169364 A1    Sep. 2, 2004

(30) Foreign Application Priority Data

Dec. 24, 2002    (JP)    ............... 2002-372751

(51) Int. Cl.
*B62D 1/11*    (2006.01)
(52) U.S. Cl. .................................... 280/777
(58) Field of Classification Search ............... 280/777, 280/775, 779; 74/493, 492
See application file for complete search history.

(56) References Cited

U.S. PATENT DOCUMENTS

| 5,704,641 | A  | * | 1/1998  | Shimizu et al. | ............ 280/775 |
| 5,737,971 | A  | * | 4/1998  | Riefe et al.   | ............... 74/493 |
| 6,099,036 | A  | * | 8/2000  | Fujiu et al.   | ............ 280/777 |
| 6,170,873 | B1 | * | 1/2001  | Jurik et al.   | ............ 280/777 |
| 6,224,104 | B1 | * | 5/2001  | Hibino         | ............ 280/777 |
| 6,659,504 | B1 | * | 12/2003 | Riefe et al.   | ............ 280/777 |
| 2004/0046379 | A1 | * | 3/2004  | Riefe       | ............ 280/777 |
| 2004/0245760 | A1 | * | 12/2004 | Kondoh et al. | ........ 280/777 |

FOREIGN PATENT DOCUMENTS

| JP | 58-130867 U | 9/1983 |
| JP | 61-50073 U  | 4/1986 |
| JP | 62-76767 U  | 5/1987 |
| JP | 62-76768 U  | 5/1987 |
| JP | 11-115770 A | 4/1999 |

* cited by examiner

*Primary Examiner*—Paul N. Dickson
*Assistant Examiner*—Drew J. Brown
(74) *Attorney, Agent, or Firm*—Foley & Lardner LLP

(57) ABSTRACT

A support apparatus for a steering column of an automotive vehicle. The support apparatus comprises an upper and lower brackets through which a lower housing of the steering column is installed to a vehicle body. The lower housing is releasable from the vehicle body through first and second releasing mechanisms. The second releasing mechanism includes a part defining a through-hole through which the front end section of the lower housing is projectable forward. An engaging and releasing device is provided such that the lower housing is engageable with the lower bracket and releasable from the lower bracket when a forward load is applied to the steering column through the engaging and releasing device. Additionally, a guide member is disposed forward of the through-hole to slidingly guide the bottom surface of the lower housing forward generally when the lower housing exits the through-hole.

7 Claims, 8 Drawing Sheets

SUPPORT APPARATUS FOR STEERING COLUMN

BACKGROUND OF THE INVENTION

This invention relates to improvements in a support apparatus for a steering column, and more particularly to the support apparatus for preventing the steering wheel side of a steering column from unexpected jumping when the steering column moves forward upon striking of a vehicle occupant at a vehicle collision.

As well known, a variety of support apparatuses for a steering column have been hitherto developed in order to prevent a so-called secondary collision of a vehicle occupant upon vehicle collision accident. One of them is disclosed in Japanese Patent Provisional Publication No. 11-115770. This support apparatus for a steering column is arranged as follows: The support apparatus includes an upper support structure and a lower support structure which are spaced from each other in the axial direction of a steering column in order to releasably fix the steering column at upper and lower two points to a vehicle body. The steering column is provided with a steering wheel which encases therein an airbag. The upper and lower support structures are in such a support condition to the steering column that each of them allows the steering column to release the steering column toward the front side of a vehicle body under an airbag inflation reaction applied to the steering column when a vehicle collision occurs. Thus, an impact absorption on the side of the steering column is cooperated with an impact absorption by the airbag. Accordingly, the above support apparatus is intended to achieve a secure impact absorption with a low cost.

In the above conventional support apparatus, when the airbag is operated or inflated, the steering column can move forward upon release of the engagement of the steering column from the vehicle body through the upper and lower support structures under the airbag inflation reaction applied to the steering column. However, in this event, the front (lower) end side of the steering column can merely move forward from the lower support structure but is restricted in releasing direction. In other words, the front end section of the steering column is not restricted in at least movement in vertical direction after it has released from the lower support structure. Accordingly, when the steering column moves forward upon receiving the airbag inflation reaction, there is the fear that the rear (upper) end section of the steering column unavoidably jumps upward under collision reaction of the vehicle occupant to the airbag. As a result, the airbag itself will jump upward through the steering wheel so that the vehicle occupant becomes out of a suitable striking position to the airbag.

SUMMARY OF THE INVENTION

It is, therefore, an object of the present invention to provide an improved support apparatus for a steering column, which can effectively overcome drawbacks encountered in conventional support structures for a steering column.

Another object of the present invention is to provide an improved support apparatus for a steering column, by which a vehicle occupant can be brought into a suitable position for the airbag device at a vehicle collision, thus improving safety for the vehicle occupant.

A further object of the present invention is to provide an improved support apparatus for a steering column, by which the front end section of the steering column at the steering wheel side can be effectively prevented from its unexpected jumping.

A still further object of the present invention is to provide an improved support apparatus for a steering column, by which the lower housing of the steering column can be prevented from its excess downward movement or falling (inclination relative to the axis of the steering column).

An aspect of the present invention resides in a support apparatus for a steering column. The support apparatus comprises an upper bracket through which a lower housing of the steering column is installed to a vehicle body. A lower bracket through which the lower housing is installed to the vehicle body is provided. The lower bracket is spaced from the upper bracket. A first releasing mechanism is provided to the upper bracket to allow the lower housing to slide forward at collision of a vehicle having the steering column. A second releasing mechanism is provided between the lower bracket and the lower housing to allow the lower housing to slide forward relative to and release from the lower bracket at the collision of the vehicle. The second releasing mechanism includes a part defining a through-hole in the lower bracket in such a manner that the front end section of the lower housing being projectable forward through the through-hole. An engaging and releasing device is provided in such a manner that the lower housing is engageable with the lower bracket and releasable from the lower bracket when a forward load is applied to the steering column through the engaging and releasing device. Additionally, a guide member is disposed forward of the through-hole to slidingly guide the bottom surface of the lower housing forward generally along an axial direction of the steering column when the lower housing gets out of the through-hole.

Another aspect of the present invention resides in a method of supporting a steering column to a vehicle body by a support apparatus. The support apparatus includes an upper bracket through which a lower housing of the steering column is installed to the vehicle body. A lower bracket through which the lower housing is installed to the vehicle body is provided. The lower bracket is spaced from the upper bracket. A first releasing mechanism is provided to the upper bracket to allow the lower housing to slide forward at collision of a vehicle having the steering column. A second releasing mechanism is provided between the lower bracket and the lower housing to allow the lower housing to slide forward relative to and release from the lower bracket at the collision of the vehicle. The second releasing mechanism includes a part defining a through-hole in the lower bracket in such a manner that the front end section of the lower housing being projectable forward through the through-hole. An engaging and releasing device is provided in such a manner that the lower housing is engageable with the lower bracket and releasable from the lower bracket when a forward load is applied to the steering column through the engaging and releasing device. Additionally, a guide member is disposed forward of the through-hole to slidingly guide the bottom surface of the lower housing forward generally along an axial direction of the steering column when the lower housing gets out of the through-hole. The through-hole has a lateral dimension larger than a vertical dimension of the through-hole. The engaging and releasing device includes a first engaging section disposed at the front end section of the lower housing and having a lateral dimension which is not larger than the vertical dimension of the through-hole, and a second engaging section disposed on the side of the lower bracket and engageable with the first engaging section, Here, the supporting method including an operation of engaging the first engaging section on the side of the lower housing with the second engaging section on the side of the lower bracket, the engaging operation comprises the following steps in the order set forth: (a) turning the first engaging section to one of right and left directions around an axis passing through the through-hole so as to incline the first engaging section relative to a regular posture of the first engaging section; (b) inserting the turned first engaging section into the through-opening; (c) returning the first engaging section into the regular posture after the first engaging section passes through the through-hole; and (d) pulling the first engaging section rearward so as to engage the first engaging section with the second engaging section.

According to the present invention, when the airbag device is operated upon collision of the vehicle, the lower housing of the steering column releases from the upper and lower brackets through the first and second releasing mechanisms under impact reaction of operation of the airbag device and therefore moves forward so that the lower housing passes through the through-hole of the upper bracket. At this time, the bottom surface of the lower housing moves forward along the axis of the steering column upon being slidingly guided by the guide member. Accordingly, the lower housing can be prevented from an excessive downward movement or falling (inclination relative to the axis of the steering column). As a result, the front end section of the steering column at the steering wheel side can be effectively prevented from its unexpected jumping.

DETAILED DESCRIPTION OF THE INVENTION

Figure 3:
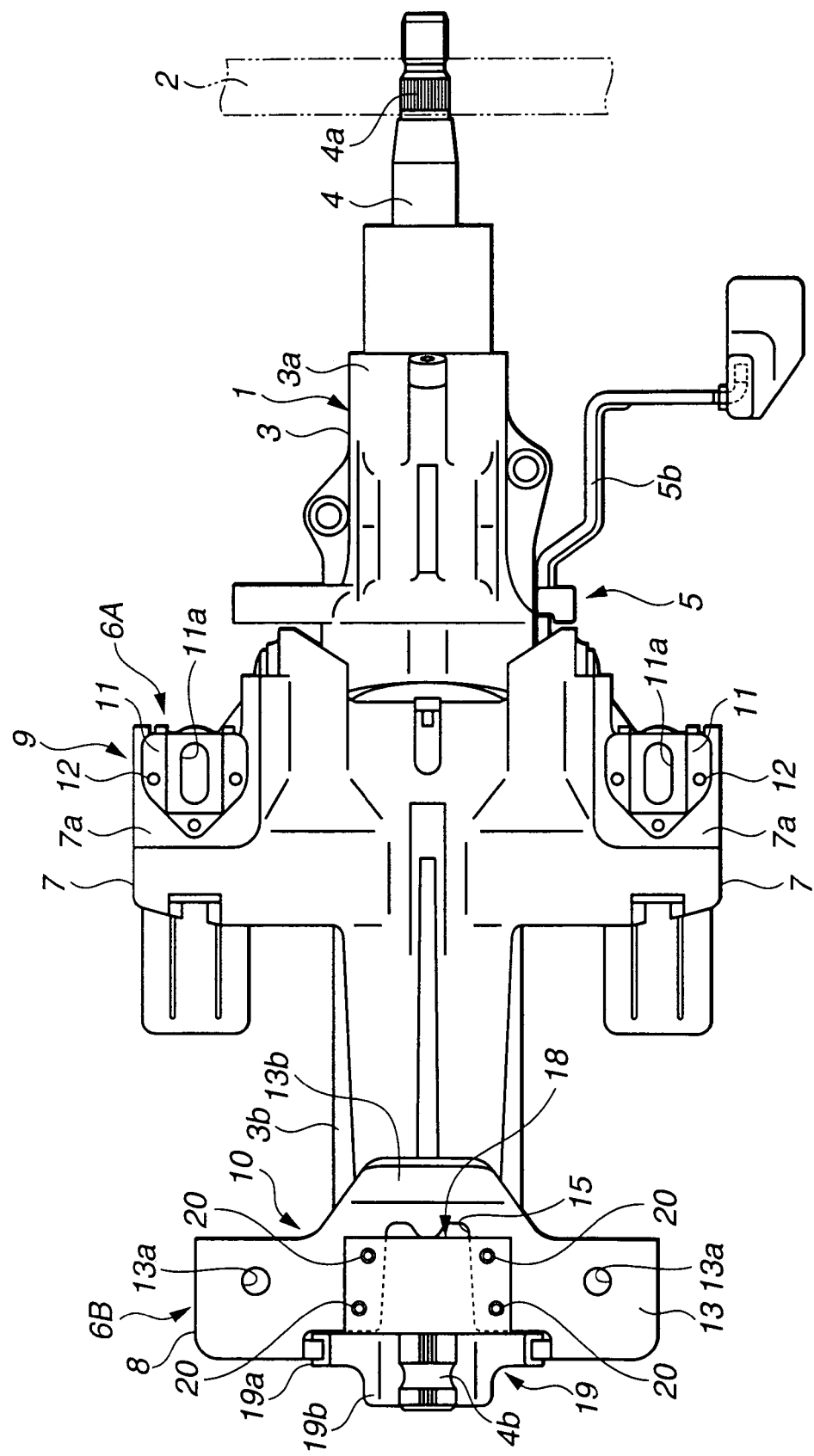
FIG. 3 is a plan view, partly in section, of the whole body of the support apparatus of FIG. 1, in combination of a steering column.
Figure 4:
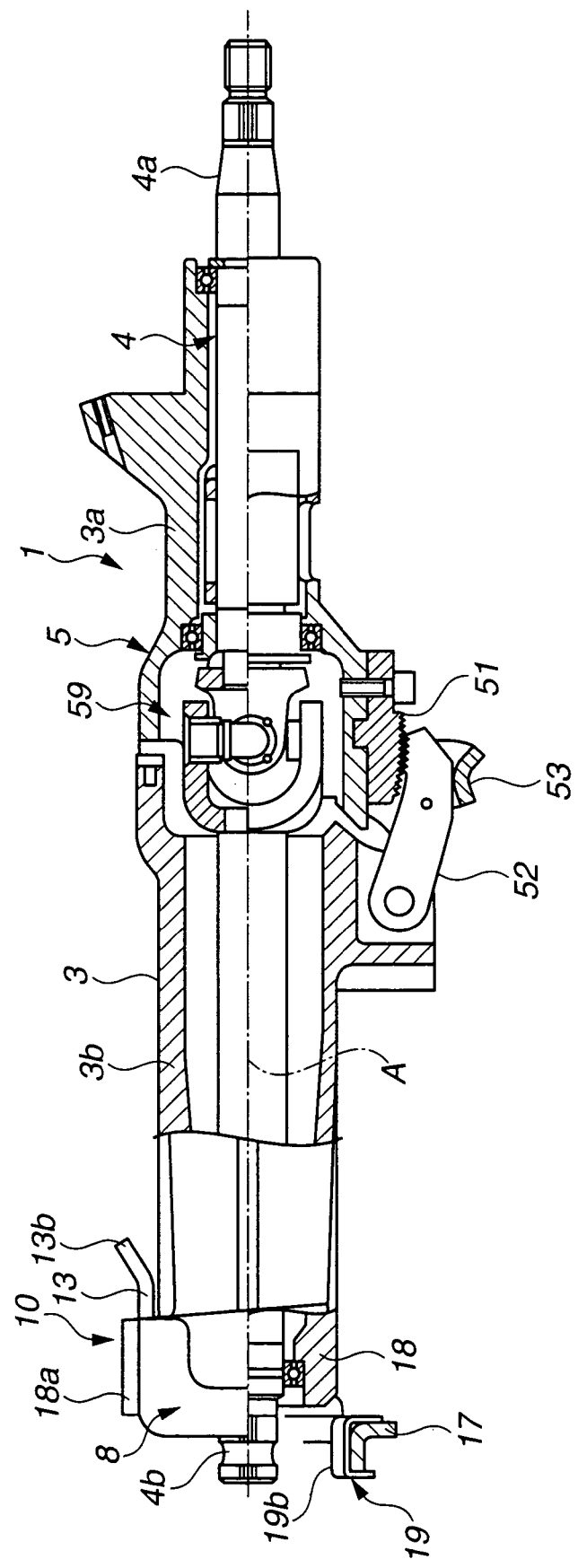
FIG. 4 is a side view, partly in section, of the whole body of the support apparatus of FIG. 3.

Referring now to FIGS. 3 and 4, an embodiment of a support structure 6 for a steering column is illustrated in combination with the steering column 1. This steering column 1 is mounted on a vehicle body of an automotive vehicle (not shown) and is of the type wherein a steering wheel 2 is tiltable. The steering wheel 2 is mounted on a rear (upper) end section of the steering column 1 and encases therein an air bag device (not shown) which is located at the central section of the steering wheel 1. A steering shaft 4 is disposed inside a jacket tube 3 in such a manner as to straight extend. A tilt mechanism 5 for the steering wheel 2 is provided at the central section of the steering column 1 in an axial direction. First and second support devices 6A, 6B for the steering shaft 4 are disposed at the rear and front sides of the steering column 1.

The jacket tube 3 of the steering column 1 is formed of aluminum alloy and includes an upper (rear) housing 3a on the side of the steering wheel 2 and a lower (front) housing 3b on the side of the front end of the steering column 1 which side is opposite to the steering wheel side. The lower housing 3b is fixed at its front-side and rear-side positions to the side of the vehicle body (not shown) by the first and second support devices 6A, 6B. The rear end side of the upper housing 3a is supported at a tilt supporting point A to the steering wheel (2) side of the lower housing 3b in such a manner as to be vertically tiltable.

The steering shaft 4 has an upper shaft section 4a which projects from the upper housing 3a. The steering wheel 2 is fixedly mounted on the upper end portion of the upper shaft section 4a. The steering shaft 4 is rotatably supported inside the upper housing 3a. A lower shaft 4b is rotatably supported inside the lower housing 3b and projects from the lower housing 3b. One end section of the lower shaft 4b is connected through a universal joint 59 to the front end section of the upper shaft 4a. The tip end portion of the lower shaft section 4b is connected to a speed-reduction mechanism (not shown).

The tilt mechanism 5 includes a stationary teeth section 51 fixed to the bottom surface of the front end side of the upper housing 3a. The stationary teeth section 51 has arcuate teeth which are formed along circles around the tilt support point A. A movable teeth section 52 is movably supported to the one end side of the lower housing 3b and has arcuate teeth which are formed along circles around the tilt supporting point A and engageable with the arcuate teeth of the stationary teeth section 51. A lock lever 53 is provided to cause the movable tooth section 52 to engage with and release from the stationary teeth section 51. The lock lever 53 is cooperated with a tilt lever 5b.

The support device 6A is located at the upper side of the lower housing 3b near the tilt mechanism 5 and formed integral with the lower housing 3b. The support device 6A includes an upper bracket 7 which is fixed through support plates 11 to the vehicle body. The support device 6B is located at the upper side of the lower housing 3b near the rear end section of the lower housing 3b. The support device 6B includes a lower bracket 8 fixed to the vehicle body. The lower bracket 8 is formed of a sheet metal and produced by bending the sheet metal. A first releasing mechanism 9 is provided between the support plate 11 and the upper bracket 7. A second releasing mechanism 10 is provided between the lower housing 3b and the lower bracket 8. The first and second releasing mechanisms 9, 10 allow the lower housing 3b to slide and release forward or in a direction of the front side of the vehicle body at a vehicle collision.

The upper bracket 7 is formed integral with the lower housing 3b and includes first and second support pieces 7a, 7a which are located opposite to each other relative to a vertical plane (not shown) containing the axis A of the steering shaft 4 and of the steering column 1. The first and second support pieces 7a, 7a are formed respectively with support cutouts (not shown) each of which leaves a U-shaped cutout edge in each of the first and second support pieces 7a, 7a. Each support cutout extends along the axis A of the steering column 1 and opens toward the steering wheel 2. Each support plate 11 is supported onto the support piece 7a through three pins 12 which are formed of plastic or synthetic resin and located around each support cutout. Each support plate 11 is formed with a bolt insertion hole 11a in which a bolt fixed to the vehicle body is to be disposed. The bolt insertion hole 11a is formed extending along the axis A of steering column 1 or in the fore-and-aft direction of the vehicle body.

The first releasing mechanism 9 is constituted of the first and second support pieces 7a, 7a, and the support plates 11, 11. When a load over a certain level is applied forward or in the direction of the front side of the vehicle body, the upper brackets 7, 7 move forward together with the lower housing 3b as a single body, and therefore move in such a direction as to release from the support plates 11, 11. At this time, each pin 12 is receives a shearing force so as to be cut, and therefore each support plate 11 is released from the support piece 7a, thereby allowing the whole steering column 1 to move forward.

Figure 1:
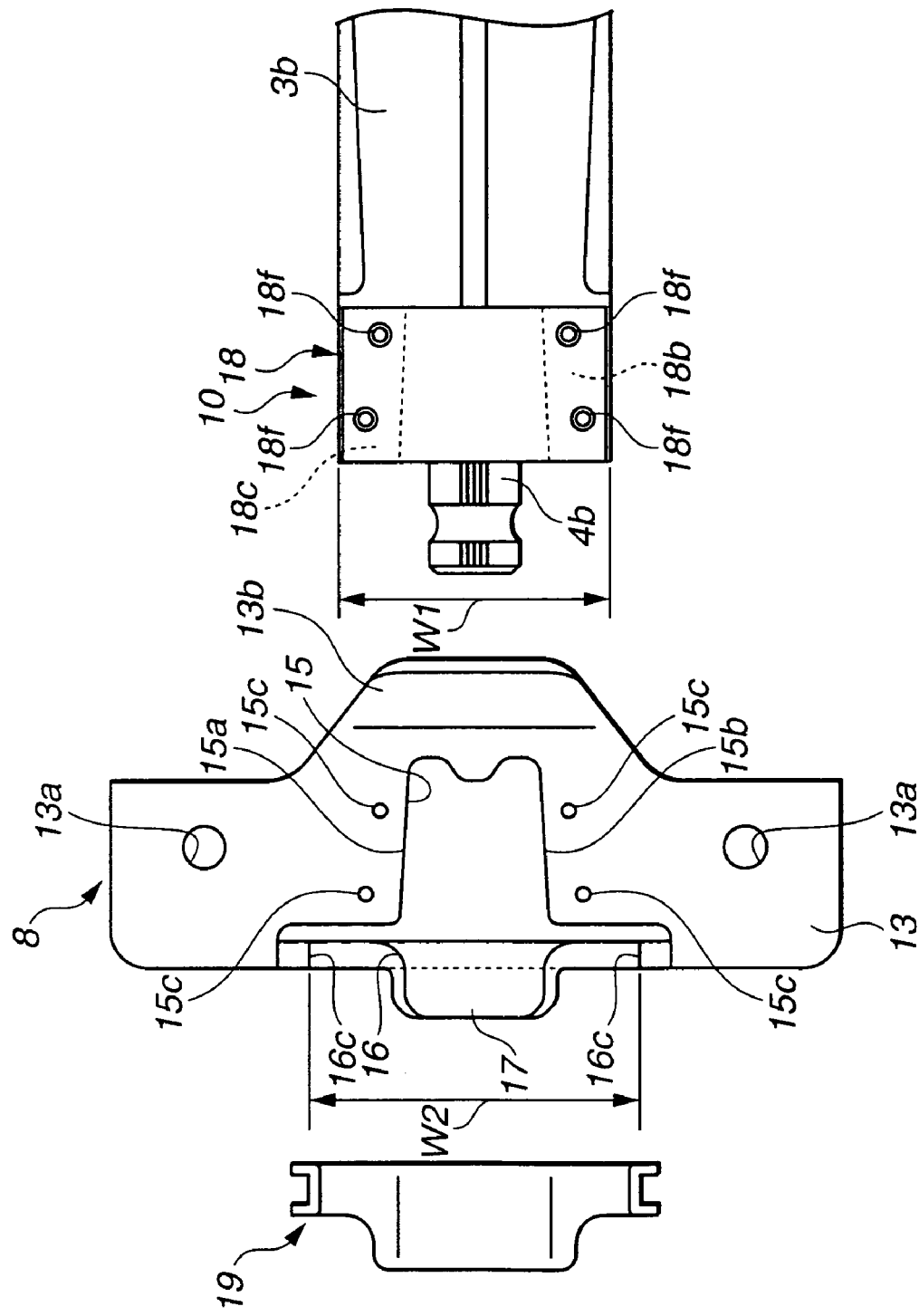
FIG. 1 is an exploded plan view of an essential part of an embodiment of a support apparatus for a steering column, according to the present invention, showing a first step of an assembly process of the support apparatus at which process constituting parts of the support structure are assembled.
Figure 2:
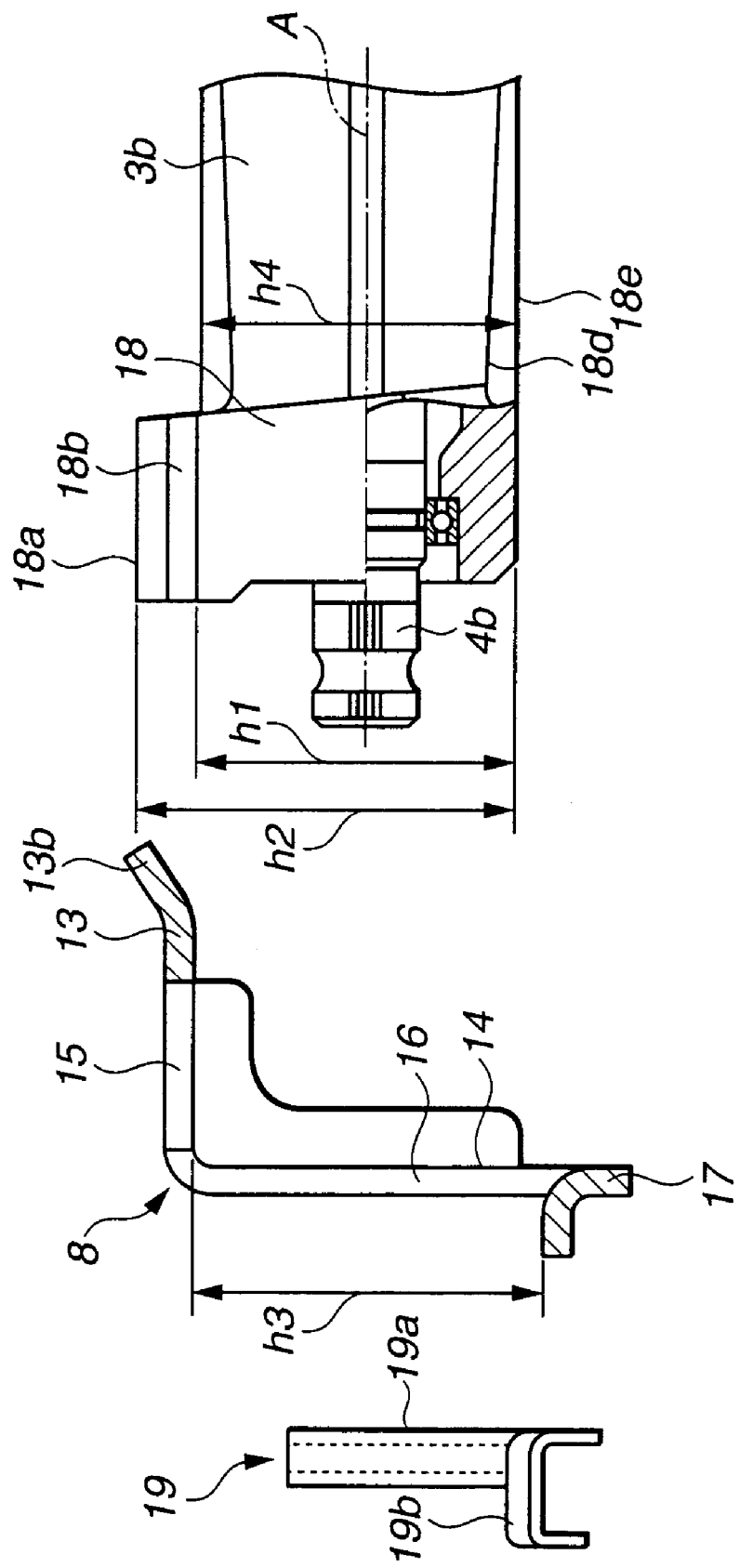
FIG. 2 is an exploded side view, partly in section, of the essential part of the support apparatus of FIG. 1.

As shown in FIGS. 1 and 2, the lower bracket 8 is formed generally L-shaped in reverse and includes a generally horizontal upper plate section 13 which is formed with two bolt insertion holes 13a, 13a located opposite to each other relative to the vertical plane containing the axis A of the steering column 1. Bolts (not shown) fixed to the vehicle body are to be disposed respectively in the bolt insertion holes 13a, 13a. A support plate section 14 is integral with the upper plate section 13 and formed by bending a sheet material of the lower bracket 8 along a generally central linear line, leaving the upper plate section 13. Specifically, the upper end of the support plate section 14 is integrally connected to the tip end of the upper plate section 13 in such a manner that the support plate section 14 is generally perpendicular to the upper plate section 13.

The upper plate section 13 is formed with a support opening 15 which is located at a generally central portion of the upper plate section 13 and formed generally rectangular in plan. As shown, the support opening 15 is open forward and therefore extends toward the support plate section 14 through the border of the upper plate section 13 and the support plate section 14. The support opening 15 is formed generally symmetrical relative to the axis A of the steering column 1. The upper plate section 13 has a guide section 13b which is raised from a central portion of the rear end edge of the main body of the upper plate section 13 in such a manner as to be inclined to the main body of the upper plate section 13. The guide section 13b is generally trapezoidal in plan and integral with the main body of the upper plate section 13. The support opening 15 is defined by opposite inner side edges 15a, 15a which are engageable with an engaging section 18 which will be discussed after.

Figure 5:
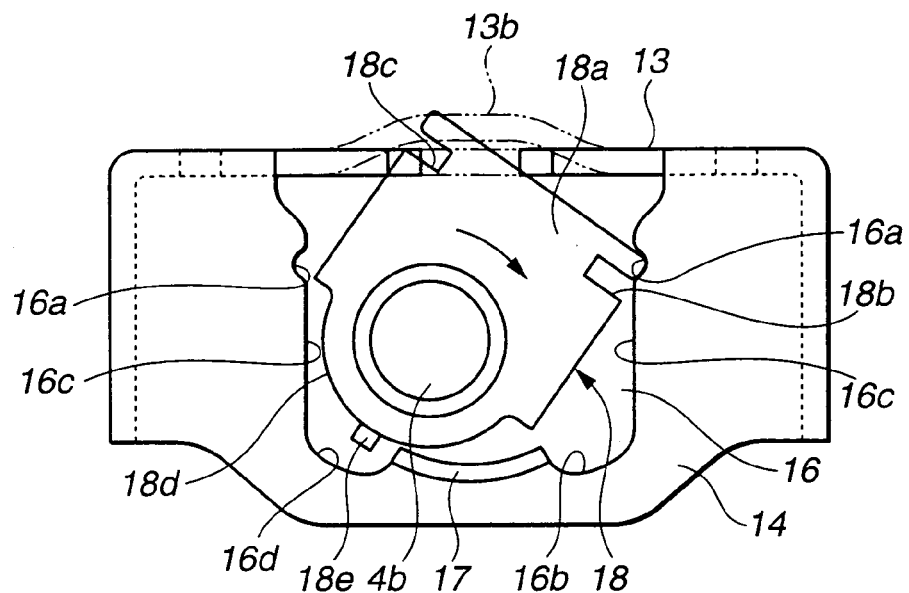
FIG. 5 is a front end view of the essential part of the support apparatus of FIG. 1, showing a second step of the assembly process at which step a lower housing is assembled with a lower bracket.

As best shown in FIG. 5, the support plate section 13 is formed with a through-hole 16 which is located at a generally central portion of the support plate section 13 and contiguous with the support opening 15 of the upper plate section 13. The through-hole 16 is generally rectangular in cross-section and formed generally symmetrical relative to the vertical plane containing the axis A of the steering column 1. The support plate section 14 has a support portion 17 of the tongue-like shape, integral with the main body of the support plate section 14. The support portion 17 is formed at the generally central portion at an inner lower peripheral edge defining the lower part of the through-hole 16 and formed by pending a part of the support plate section 13 forward or perpendicularly relative to the main body of the support plate section 14. As shown in FIG. 5, the opposite side parts of the through-hole 16 are defined by opposite inner side edges 16c, 16c of the support plate section 14. The opposite inner side edges 16c, 16c are formed respectively with first depressions 16a, 16a which are located at the upper parts of opposite inner side edges 16c, 16c. The lower part of the through-hole 16 is defined by an inner bottom edge (no numeral) of the support plate section 14. The inner bottom edge is formed with two depressions 16d, 16d which are located on the opposite sides of the support section 17 and contiguous with the support section 17. Each of the second depressions 16d, 16d is generally arcuate. The inner bottom edge is contiguous with the opposite inner side edges 16c, 16c.

As shown in FIGS. 1, 2 and 5, the tip end section of the lower housing 3b is integrally formed with the engaging section 18 which incorporates with the opposite inner side edges 15a, 15a of the upper plate section 13 so as to constitute an engaging and releasing means or device. This engaging section 18 is formed generally block-shaped and has an upper section 18a which is rectangular in plan and formed at its side portions with opposite engaging grooves (first and second straight extending engaging portions) 18b, 18c. The opposite engaging grooves 18b, 18c are parallel and extend along the axis A of the steering column 1. The opposite engaging grooves 18b, 18c are respectively brought into sliding engagement with the opposite inner side edges (third and fourth straight extending engaging portions) 15a, 15b of the upper plate section 13 by sliding the opposite engaging grooves 18b, 18c along the opposite inner side edges 15a, 15b upon engagement of them. As shown, the lower shaft 4b of the steering shaft 4 pierces the engaging section 18 and projects forward of the engaging section 18. The engaging section 18 has a generally semicylindrical bottom surface 18d. A projection 18e is integrally formed at the bottom surface 18d. The upper section 18a is formed at its upper surface with four pin holes 18f, in which a pair of pin holes 18f and another pair of pin holes 18f are respectively located at the opposite side portions of the upper surface. Small diameter pins 20 are respectively fixedly disposed in the pin holes 18f. The pin holes 18f correspond respectively to the four pin holes 15c, in which a pair of the pin holes 15c and another pair of the pin holes 15c are formed respectively at the opposite sides of the support opening 15. The small diameter pins 20 are respectively fixedly disposed in the pin holes 18f. Each pin 20 extends into each pin hole 15c of the upper plate section 13 of the lower bracket 8, so that the engaging section 18 is fixed to the lower bracket 8 with the four pins 20. Each pin 20 is formed of plastic or synthetic resin.

Figure 12:
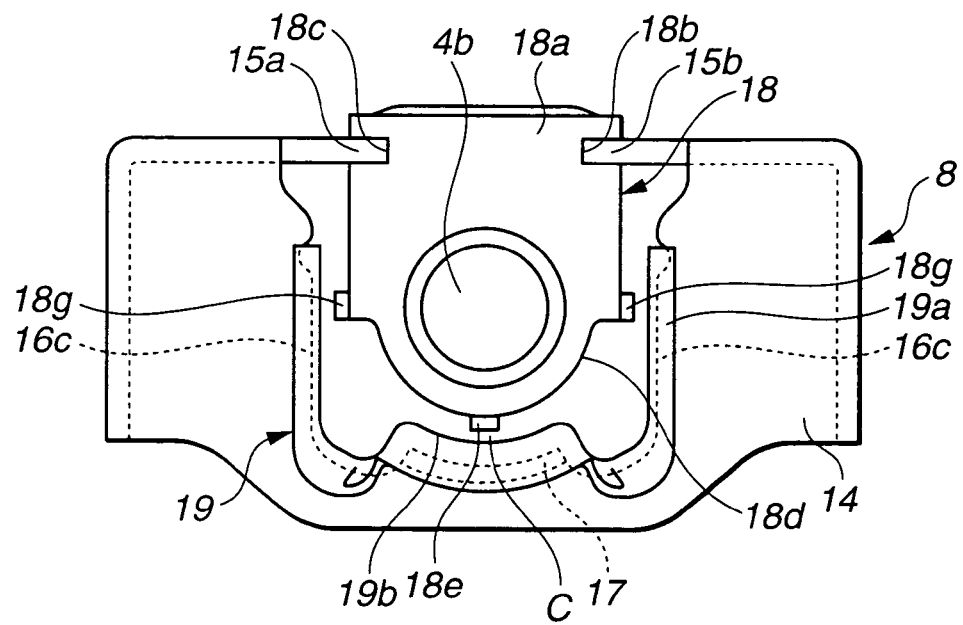
FIG. 12 is a front end view of the support apparatus of FIG. 10.

A guide member 19 is attached to the support portion 17 of the lower bracket 8 and functions to slidably guide the bottom surface 18d of the engaging section 18 moving forward along the axis A of the steering column 1 when the engaging section 18 gets out forward through the through-hole 16 of the lower bracket 8. This guide member 19 is formed of a plastic or synthetic resin as a material low in frictional resistance and formed generally U-shaped upon being bent, so as to correspond to the shape of the support portion 17 and the bottom inner edge (16*d*, 17, 16*d*) and the opposite inner side edges 16*c*, 16*c* of the support plate section 17. The guide member 19 includes a generally U-shaped fitting section 19*a* which is to be fitted to the opposite inner side edges 16*c*, 16*c* and the bottom inner edge of the support plate section 17 as shown in FIG. 12. Specifically, the fitting section 19*a* is formed generally channel-shaped so as to be formed with a groove. Additionally, a guide piece section 19*b* is formed integral with the fitting section 19*a* at a generally central portion in its longitudinal direction.

Thus, the second releasing mechanism 10 is constituted of the through-hole 16, the opposite inner side edges 15*a*, 15*b* defining the support opening 15 forming part of the engaging and releasing means, and the guide member 19. The second releasing mechanism 10 functions as follows: When the forward load over the certain level is applied to the steering column 1, the engaging section 18 of the lower housing 3*a* receives a force for causing the engaging section 18 to slidingly get out from the opposite inner side edges 15*a*, 15*b*, so that the respective pins 20 are subjected to shearing action and cut. Accordingly, the engaging section 18 releases forward from the lower bracket 8. As a result, the whole steering column 1 moves forward upon cooperation of the second releasing mechanism 10 with the first releasing mechanism 9.

Additionally, the sizes of the through-hole 16 and the engaging section 18 are set in a relationship shown in FIGS. 1 and 2. That is, the length (vertical dimension) h3 of the through-hole 16 is larger than or equal to the height (vertical dimension) h1 which is from the bottom surface to the lower end edge of the engaging groove 18*b* of the engaging section 18, and larger than or equal to the width (lateral dimension) W1 of the engaging section 18. Additionally, the width W1 of the engaging section 18 is larger than or equal to the height (vertical dimension) h4 of the lower housing 3*b* (h1 ≦h3≧W1≧h4). Furthermore, the height h2 of whole engaging section 18 is equal to or slightly smaller than width W2 of the through-hole 16 (h2≧W2). Moreover, the width W2 of the through-hole 16 is larger than the height h3 of the through-hole 16 (W2 >h3).

Due to above relationship in size, installation operation of the engaging section 18 to the lower bracket 8 is somewhat troublesome; however, it will be understood that the clearance between the outer peripheral surface of the engaging section 18 and the inner peripheral edge defining the through-hole 16, particularly the clearance between the upper surface (defining the bottom end of the through-hole 16) of the guide piece 19*b* of the guide member 19 and the bottom surface 18*d* of the engaging section 18 can be set as small as possible, while largely reducing the number of parts constituting the support structure for the steering column 1.

Operation and effects of the support apparatus for a steering column, according to the present invention will be discussed hereinafter.

First, a procedure for installing the lower housing 3*b* to the lower bracket 8 will be explained with reference to FIGS. 1 and 5 to 12.

Figure 6:
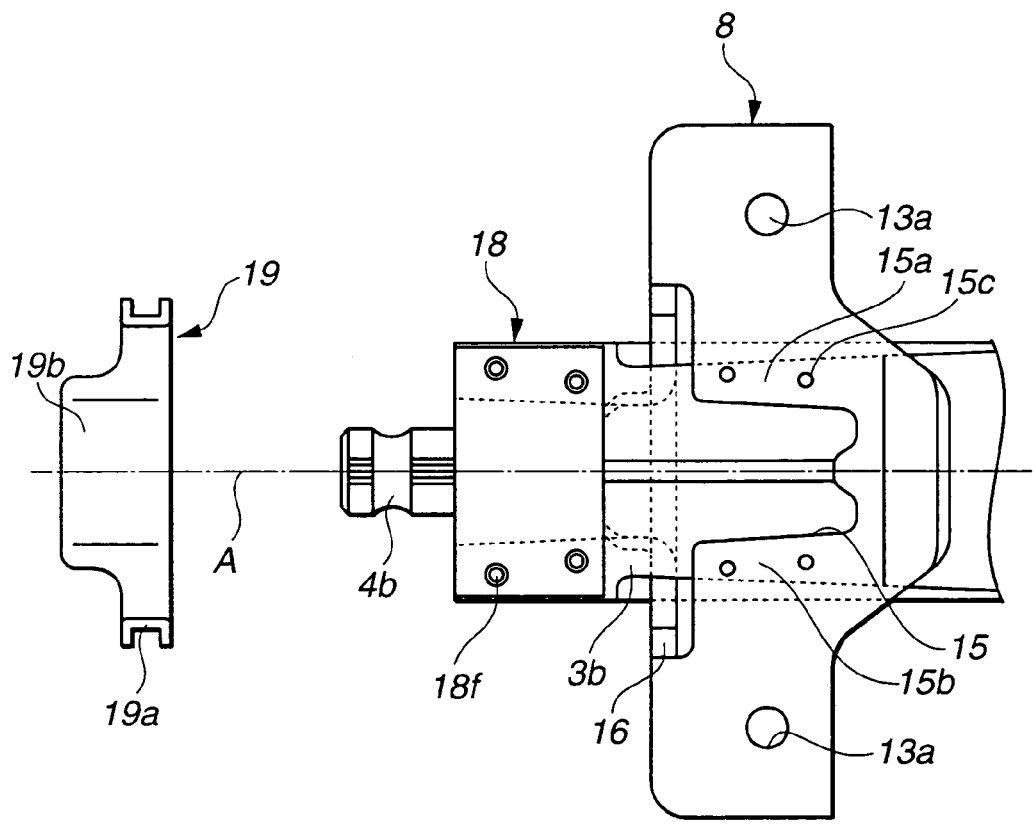
FIG. 6 is a plan view of the essential part of the support apparatus of FIG. 1, showing a third step of the assembly process at which step the lower housing is assembled with the lower bracket.
Figure 7:
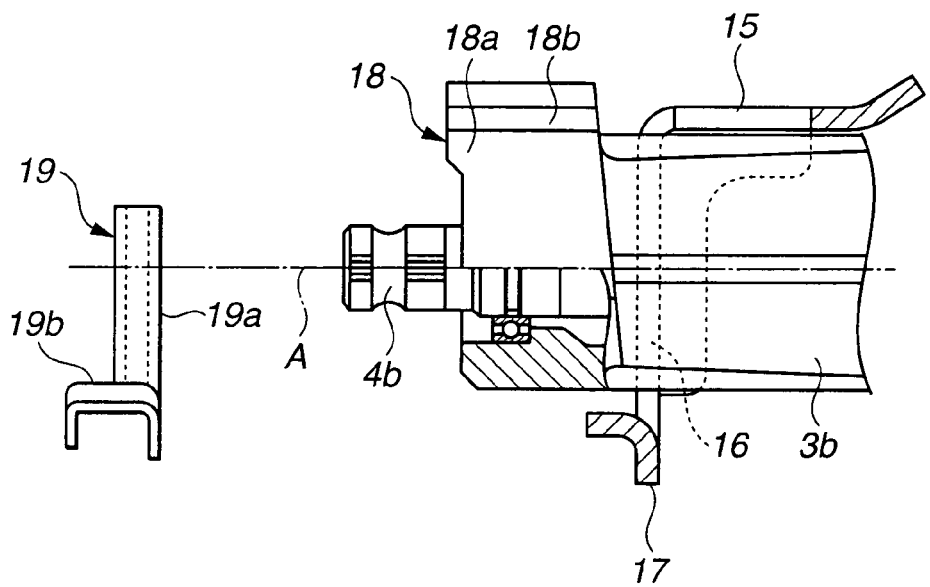
FIG. 7 is a side view, partly in section, of the support apparatus of FIG. 6.

In order to assemble the lower housing 3*b*, the lower bracket 8 and the guide member 19 into one unit from their separated condition of FIGS. 1 and 2, it will be understood that it is impossible to insert or fit the engaging section 18 of the lower housing 3*b* into the through-hole 16 of the lower bracket 8 in a state where the lower housing 3*b*, the lower bracket 8 and the guide member 19 are in regular postures as shown in FIGS. 1 and 2. Therefore, the engaging section 18 is passed through the through-hole 16 upon being inclined 90 degrees in angle, or upon being rotated in a direction of an arrow as shown in FIG. 5 in which one side edge of the upper end section 18*a* of the engaging section 18 is inserted into the support opening 15, and the other side edge of the upper end section 18*a* is passed forward through or by using the first depression 16*a* while the projection 18*e* is passed forward through or by using the second depression 16*d*. By this, the whole engaging section 18 can be fitted into the through-hole 16, and then the engaging section 18 is rotated to be returned to its regular posture as shown in FIGS. 6 and 7.

Figure 8:
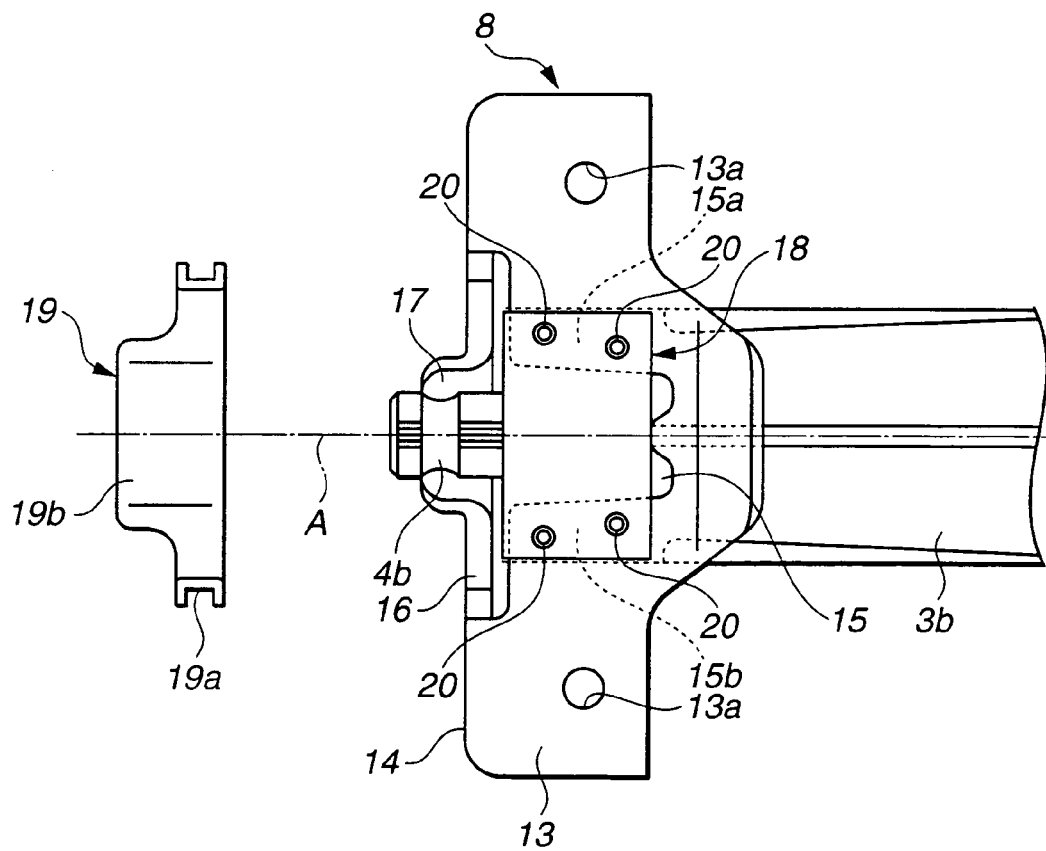
FIG. 8 is a plan view of the essential part of the support apparatus of FIG. 1, showing a fourth step of the assembly process at which step the lower housing is assembled with the lower bracket.
Figure 9:
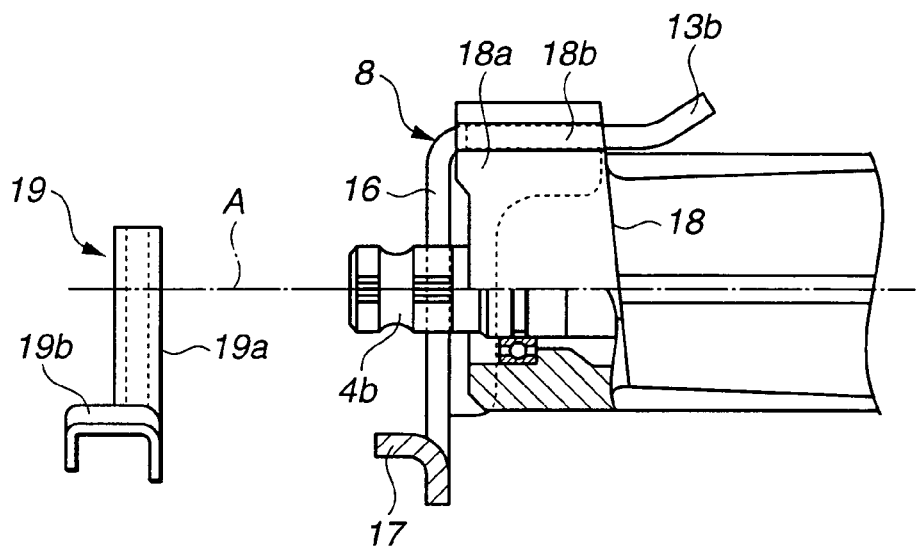
FIG. 9 is a side view, partly in section, of the support apparatus of FIG. 8.

Thereafter, as shown in FIGS. 8 and 9, the opposite engaging grooves 18*b*, 18*c* of the engaging section 18 are respectively brought into coincidence with the opposite inner side edges 15*a*, 15*b* of the support opening 15 upon the side of the engaging section 18 being slightly raised. Then, the lower housing 3*b* is pulled back as it is, and therefore the opposite engaging grooves 18*b*, 18*c* are respectively into engagement with the inner side edges 15*a*, 15*b* upon sliding. Then, the engaging section 18 is fixed to the lower bracket 8 by using the pins 20.

Figure 10:
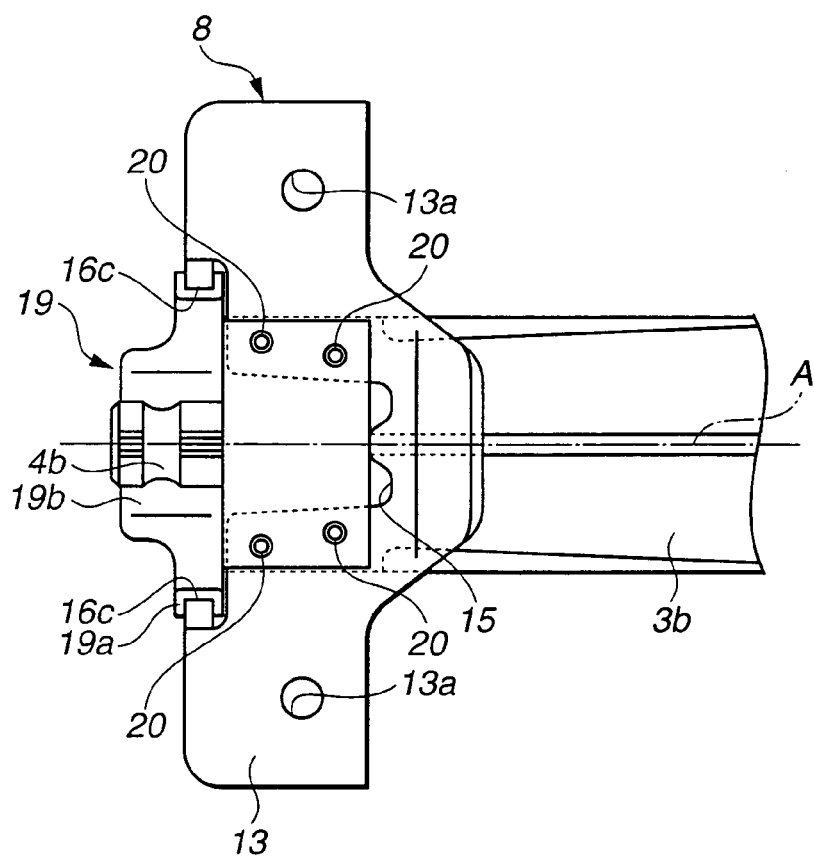
FIG. 10 is a plan view of the essential part of the support apparatus of FIG. 1, showing a state where the assembly of the lower housing with the lower bracket is completed in the assembly process.
Figure 11:
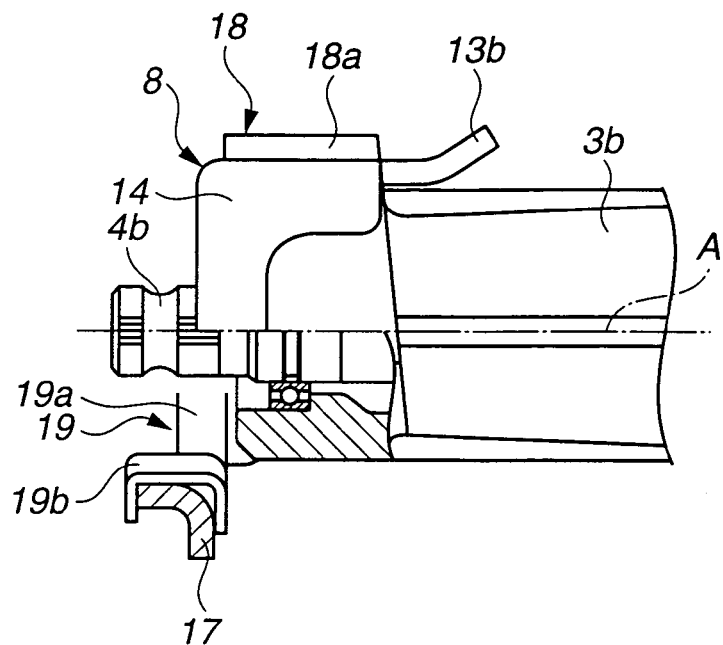
FIG. 11 is a side view, partly in section, of the support apparatus of FIG. 10.

Subsequently, as shown in FIGS. 10 and 11, the guide member 19 is fitted and fixed to the support portion 17 and the opposite inner side edges 16*c*, 16*c* of the lower bracket 8 upon pressing the guide member 19 from the upper side, thus completing the assembly operation for the constituting parts of the support apparatus for the steering column 1. The opposite elongate portions of the fitting section 19*a* of the guide member 19 are respectively provided with projections inside the groove of the fitting section 19*a*, in which the projections are respectively brought into engagement with the first depressions 16*a*, 16*a* at the inner side edges 16*c*, 16*c* of the lower bracket 8, thereby preventing the guide member 19 from getting off from the lower bracket 8.

In this state, as shown in FIG. 12, a clearance C between the projection 18*e* of the engaging section 18 and the upper surface of the guide piece section 19*b* of guide member 19 can be suppressed as small as possible. A clearance between the engaging section 18 and each of the opposite side edges 16*c* of the through-hole 16 is further minimized under the effect of the fitting section 19*a* of the guide member 19. Additionally, as shown in FIG. 12, the lower housing 3*b* may be provided with projections 18*g*, 18*g* similar to the projection 18*e*, located respectively at the opposite side surfaces of the lower housing 3*b* as shown in FIG. 12.

According to the above embodiment, when the airbag device is operated upon collision of the vehicle, the lower housing 3*b* of the steering column 1 releases from the support plates 11, 11 and the lower bracket 8 through the first and second releasing mechanisms 9, 10 under the impact reaction of operation or inflation of the airbag device and therefore moves forward or in the direction of the front side of the vehicle body, so that the engaging section 18 passes through the through-hole 16 of the lower bracket 8. At this time, the projection 18*e* at the bottom surface 18*d* of the engaging section 18 moves forward along the axis A of the steering column 1 upon being slidingly guided at the upper surface of the guide piece section 19*b* of the guide member 19. Accordingly, the engaging section 18 and the lower housing 3*b* can be prevented from an excessive downward movement or falling (inclination relative to the axis A of the steering column 1), thus effectively restricting the downward movement of the engaging section 18 and the lower housing 3b. As a result, the front end section of the steering column 1 at the steering wheel (2) side can be effectively prevented from its unexpected jumping. Thus, according to this embodiment, the releasing mechanisms 9, 10 can be formed with the minimum number of parts, while a vehicle occupant can be brought into a suitable position for the airbag device at a vehicle collision thereby further improving safety for the vehicle occupant.

Additionally, according to the above embodiment, the size (particularly, the vertical size) of the through-hole 16 of the lower bracket 8 can be set as small as possible. Therefore, the clearance between the outer peripheral surface of the engaging section 18 and the inner peripheral edge defining the through-hole 16, particularly the clearance between the upper surface (defining the bottom end of the through-hole 16) of the guide piece 19b of the guide member 19 and the bottom surface 18d of the engaging section 18 can be set as small as possible, upon cooperation with the guide member 19. Accordingly, vertical movement of the lower housing 3b of the steering column 1 during forward movement of the steering column 1 can be further effectively restricted, thereby making it possible to guide the moving steering column 1 generally along the axis A of the steering column 1 in a normal state before the vehicle collision occurs.

Since the guide member 19 is formed of plastic as the low frictional resistance material, the engaging section 18 is slidingly and smoothly guided at its bottom surface 18e by the upper surface of the guide piece section 19b of the guide member 19 during the forward axial movement of the steering column 1, thereby ensuring smooth forward movement of the whole steering column 1.

As appreciated from the above, according to the present invention, when the steering column moves forward, for example, at a vehicle collision, the lower housing 3b can be prevented from an excessive downward movement or falling (inclination relative to the axis of the steering column), thus effectively restricting the downward movement of the lower housing 3b. Accordingly, the front end section of the steering column 1 at the steering wheel side can be effectively prevented from its unexpected jumping. As a result, a vehicle occupant can be brought to a suitable position for the airbag device at a vehicle collision thereby further improving safety for the vehicle occupant.

The entire contents of Japanese Patent Application P2002-372751 (filed Dec. 24, 2002) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A support apparatus for a steering column, comprising: an upper bracket through which a lower housing of the steering column is installed to a vehicle body; a lower bracket through which the lower housing is installed to the vehicle body, the lower bracket being spaced from the upper bracket; a first releasing mechanism provided to the upper bracket to allow the lower housing to slide forward at collision of a vehicle having the steering column; and a second releasing mechanism provided between the lower bracket and the lower housing to allow the lower housing to slide forward relative to and release from the lower bracket at the collision of the vehicle, the second releasing mechanism including means defining a through-hole in the lower bracket, the front end section of the lower housing being projectable forward through the through-hole, an engaging and releasing device through which the lower housing is engageable with the lower bracket and releasable from the lower bracket when a forward load is applied to the steering column, and a guide member disposed forward of the through-hole to slidingly guide the bottom surface of the lower housing forward generally along an axial direction of the steering column at a normal state when the front end section of the lower housing gets out of the through-hole.

2. A support apparatus as claimed in claim 1, wherein the guide member is formed of a material which is lower in frictional resistance than metal.

3. A support apparatus as claimed in claim 1, wherein the lower bracket is disposed forward of the upper bracket.

4. A support apparatus as claimed in claim 1, wherein the guide member slidingly guides substantially only the bottom surface of the lower housing.

5. A support apparatus for a steering column, comprising:
an upper bracket through which a lower housing of the steering column is installed to a vehicle body;
a lower bracket through which the lower hosing is installed to the vehicle body, the lower bracket being spaced from the upper bracket;
a first releasing mechanism provided to the upper bracket to allow the lower housing to slide forward at collision of a vehicle having the steering column; and
a second releasing mechanism provided between the lower bracket and the lower housing to allow the lower housing to slide forward relative to and release from the lower bracket at the collision of the vehicle, the second releasing mechanism including means defining a through-hole in the lower bracket, the front end section of the lower housing being projectable forward through the through-hole in the lower bracket, an engaging and releasing device through which the lower housing is engageable with the lower bracket and releasable from the lower bracket when a forward load is applied to the steering column, and a guide member disposed forward of the through-hole to slidingly guide the bottom surface of the lower housing forward generally along an axial direction of the steering column at a normal state when the front end section of the lower housing gets out of the through hole,
wherein the through-hole has a lateral dimension larger than a vertical dimension of the through-hole, and the engaging and releasing device includes a first engaging section disposed at the front end section of the lower housing and having a lateral dimension which is not larger than the vertical dimension of the through-hole, and a second engaging section disposed on the side of the lower bracket and engageable with the first engaging section, so that the first engaging section on the side of the lower housing is engaged with the second engaging section on the side of the lower bracket by inserting the first engaging section into the through-opening upon turning the first engaging section to one of right and left directions around an axis passing through the through-hole so as to incline the first engaging section relative to a regular posture of the first engaging section, and pulling the first engaging section rearward upon returning the first engaging section into the regular posture after the first engaging section passes through the through-hole.

6. A support apparatus as claimed in claim 5, wherein the first engaging section includes first and second straight extending engaging portions which extend generally along the axis of the steering column, and the second engaging section includes third and fourth straight extending engaging portions which extend generally along the axis of the steering column and engageable respectively with the first and second straight extending engaging portions.

7. A method of supporting a steering column to a vehicle body by a support apparatus, the support apparatus including an upper bracket through which a lower housing of the steering column is installed to the vehicle body; a lower bracket through which the lower housing is installed to the vehicle body, the lower bracket being spaced from the upper bracket; a first releasing mechanism provided to the upper bracket to allow the lower housing to slide forward at collision of a vehicle having the steering column; and a second releasing mechanism provided between the lower bracket and the lower housing to allow the lower housing to slide forward relative to and release from the lower bracket at the collision of the vehicle, the second releasing mechanism including means defining a through-hole in the lower bracket, the front end section of the lower housing being projectable forward through the through-hole, an engaging and releasing device through which the lower housing is engageable with the lower bracket and releasable from the lower bracket when a forward load is applied to the steering column, and a guide member disposed forward of the through-hole to slidingly guide the bottom surface of the lower housing forward generally along an axial direction of the steering column at a normal state when the lower housing gets out of the through-hole, the through-hole having a lateral dimension larger than a vertical dimension of the through-hole, wherein the engaging and releasing device includes a first engaging section disposed at the front end section of the lower housing and having a lateral dimension which is not larger than the vertical dimension of the through-hole, and a second engaging section disposed at on the side of the lower bracket and engageable with the first engaging section, the supporting method including an operation of engaging the first engaging section on the side of the lower housing with the second engaging section on the side of the lower bracket, the engaging operation comprising the following steps in the order set forth: turning the first engaging section to one of right and left directions around an axis passing through the through-hole so as to incline the first engaging section relative to a regular posture of the first engaging section; inserting the turned first engaging section into the through-opening; returning the first engaging section into the regular posture after the first engaging section passes through the through-hole; and pulling the first engaging section rearward so as to engage the first engaging section with the second engaging section.

* * * * *